United States Patent [19]

Meadus et al.

[11] 4,158,648

[45] Jun. 19, 1979

[54] PRESSURE- AND HEAT-SENSITIVE COATINGS

[75] Inventors: Frederick W. Meadus; Ira E. Puddington; Bryan D. Sparks, all of Ottawa, Canada

[73] Assignee: Canadian Patents and Development Limited, Ottawa, Canada

[21] Appl. No.: 861,873

[22] Filed: Dec. 19, 1977

Related U.S. Application Data

[63] Continuation-in-part of Ser. No. 669,754, Mar. 24, 1976, abandoned, which is a continuation-in-part of Ser. No. 316,726, Dec. 20, 1972, Pat. No. 3,967,034.

[30] Foreign Application Priority Data

Dec. 12, 1971 [CA] Canada .................................. 130879
Mar. 25, 1977 [CA] Canada .................................. 274536

[51] Int. Cl.² ...................... C08L 31/04; C08L 31/02; C08L 61/24
[52] U.S. Cl. ......................................... 260/15; 106/19; 106/171; 106/243; 260/17 R; 260/18 R; 260/21; 260/23 R; 260/23 AR; 282/27.5; 428/488
[58] Field of Search ............... 428/318, 488, 319, 914; 260/23 R, 18 R, 21, 23 AR, 15, 17 R; 106/19, 171, 243; 427/144, 146; 282/27.5

[56] References Cited

U.S. PATENT DOCUMENTS

| | | | |
|---|---|---|---|
| 1,293,983 | 2/1919 | Thomas | 428/319 |
| 1,819,078 | 8/1931 | de Waele | 428/319 |
| 1,830,980 | 11/1931 | Carr | 260/23 R |
| 2,313,808 | 3/1943 | Dalton | 428/318 |
| 2,313,810 | 3/1943 | Dalton | 428/318 |
| 3,619,157 | 11/1971 | Brinckman | 96/27 |
| 3,967,034 | 6/1976 | Meadus et al. | 428/323 |

*Primary Examiner*—Earl A. Nielsen
*Attorney, Agent, or Firm*—Larson, Taylor and Hinds

[57] ABSTRACT

A composition for forming pressure- and heat-sensitive coatings comprising finely divided organic material of particle size from about 0.05 to 10 micrometers in diameter having a melting point above about 150° C., the particles being of substantially uniform color and subject to plastic flow by heat or pressure, and a liquid carrier normally including a binder dispersed in the carrier to give a thixotropic gel. The composition optionally includes water-soluble or dispersible dye or a pigment uniformly dispersed in said particles. A method of preparing the compositions comprises precipitating the solid organic material in water, normally incorporating a binder, and optionally incorporating coloring material into the organic material to form a gel-type paste.

27 Claims, 1 Drawing Figure

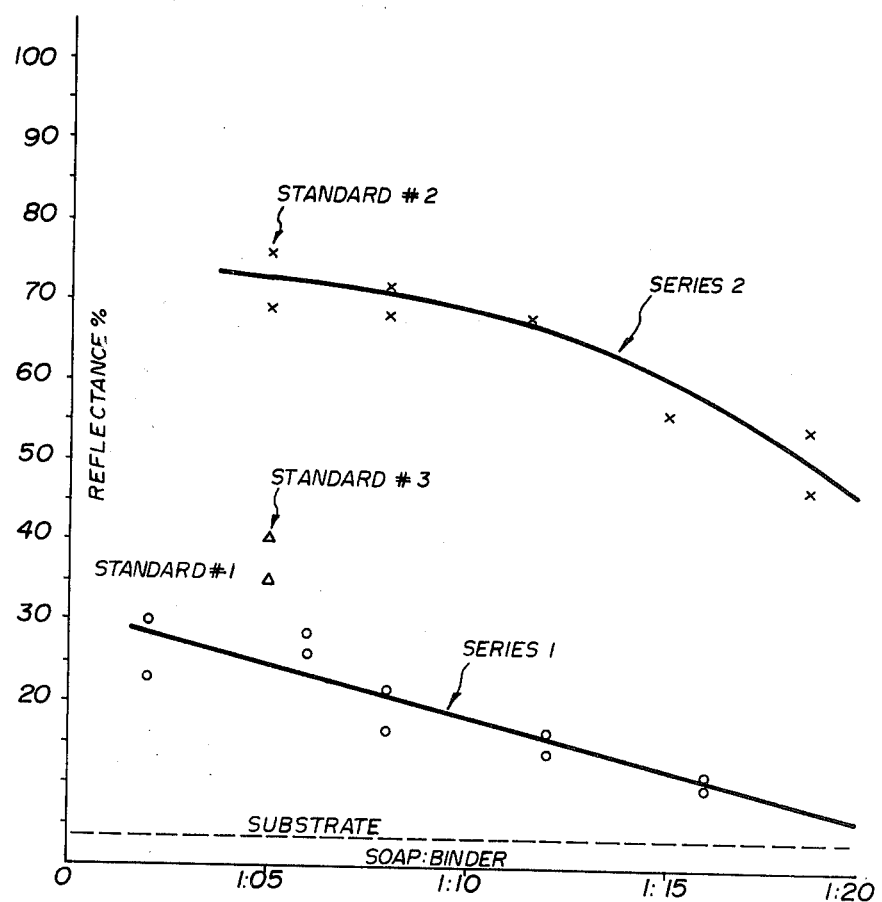

PRESSURE- AND HEAT-SENSITIVE COATINGS

BACKGROUND OF THE INVENTION

1. Field Of The Invention

This application is a continuation-in-part of U.S. application Ser. No. 669,754 filed Mar. 24, 1976, now abandoned which was a continuation-in-part of U.S. application Ser. No. 316,726, filed Dec. 20, 1972 now U.S. Pat. No. 3,967,034.

The present invention relates to similar coating compositions, pressure-sensitive and heat-sensitive coatings and a process for preparing same.

2. Description Of The Prior Art

Present pressure-sensitive copying systems are primarily of two types. One such system, which is typified by ordinary carbon paper, provides a mark under pressure by transfer at the areas of pressure of a complete mass of coating containing carbon black or other pigment. This waxy mixture is relatively soft and of low tensile strength and is, therefore, not resistant to scuff or offset. The mark obtained on the copy sheet is also prone to smudge and offset onto hands and clothing.

A second type of pressure-sensitive copying system employs, on one side of a sheet, a continuous coating containing marking, fluid inclusions. In accordance with this system, the paper of a record material is coated on one surface with a continuous film containing minute droplets of an oily marking fluid. In this type of copying sheet, the marking fluid may be coloured or it may be colourless but capable of forming a colour by a chemical reaction with another chemical upon being brought into contact with each other. Under the pressure of writing or typing, the coating ruptures and the droplets of marking fluid exude on to the copy sheet to make a mark by direct coloration or colour transfer or by forming a colour by chemical reaction with a correacting chemical on the adjacent surface of the copy sheet. The difficulty with products of this type is that the surface of the coated sheet is susceptible to scuffing, abrasion and incidental rubbing which unavoidably causes rupture of the film, release of the marking fluid, and consequently smudge or offset or both. Also, on storage of the sheets, the coating material tends to dry out and crack, particularly when bended or folded, thus releasing the marking fluid through the resulting cracks to smudge or offset an adjacent copy sheet or the hands or clothing. In the case of such coatings, containing a colourless marking fluid, this difficulty arises only when the ruptured film is in contact with a copy sheet or other source of the co-reacting chemical. But this is a very real disadvantage since such copying materials are not only used, but usually stored in this condition.

In the past, for example, according to Canadian Pat. No. 627,609 to Schossberger et al, pressure-sensitive particles having a dark core and a frangible light-coloured pigment covering are described. Under pressure the covering breaks and the dark core is exposed. Moreover, the pigments contained in the covering as described in this patent are limited to light-coloured pigments, for example titanium dioxide.

H. R. Dalton has proposed pressure-sensitive coatings from aqueous dispersions of milled soap particles and binding agents (see U.S. Pat. No. 2,313,808). Applicants have however found these coatings to be very susceptible to transfer and marring, to be of low heat-resistance and have a waxy feel. It would be desirable to increase the opacity, the adhesion to substrate, the mar resistance, heat resistance and reduce or eliminate the waxy feel of such coatings.

It is accordingly an object of the invention to provide a solid phase coating which avoids many of the aforementioned objections.

Further objects and advantages of the invention will be set forth in part in the following specification and in part will be obvious therefrom without being specifically referred to, the same being realized and attained as pointed out in the claims thereof.

With the above and other objects of the invention in view the particles of the coating of the present invention contain no hard core or covering (and no liquid), and the development of contrast does not depend on the rupturing of a thin skin, but on the flowing together, compacting and smoothing of the coating layer. Moreover, the particles of the novel coating do not simply crush, but compact and tend to flow together when pressure or heat is applied. Additionally, when colouring material is incorporated into the coating, the particles of the novel pressure-sensitive coating have the pigment or dye distributed evenly throughout, not one pigment in the covering layer and another in the hard core as taught by the above Canadian patent.

According to the applicants U.S. Pat. No. 3,967,034, a pressure-sensitive and heat-sensitive coating was provided having, a compactible open porous continuous matrix structure of contiguous fine, discrete, stable, light-scattering meldable organic plate-like particles of a solid organic material melting above about 55° C. and fine light-scattering pores. The particles were in the light-scattering range of about 0.001 to 50 microns in diameter and were selected from fatty acids, fatty alcohols and mixtures thereof or lignin. The applied coating had a smooth surface and adhered to paper or other suitable substrate materials. The coated material was handleable without marking, and showed clear characters when subjected to pressure, for example, by a credit card.

The present invention also concerns a pressure- and heat-sensitive coating and proceeds to provide this sensitive coating by precipitation of suitably sized particles of selected soaps in an aqueous system to give a gel-type structure.

The coating has a reduced health and fire hazard rating and is compatible with existing aqueous coating equipment, thus avoiding the procurement of expensive, explosion proof coating systems. Furthermore, the coatings of the present invention exhibit good mar resistance and also resistance to heat up to 150° C., which is a distant advantage during thermal drying of the coating.

SUMMARY OF THE INVENTION

In accordance now with the present invention there is provided a composition, which on drying on a substrate forms a pressure- and heat-sensitive coating, comprising (a) meldable metal soap particles of about 0.05 to 10 micrometers in diameter having a cation selected from the group consisting of calcium, nickel, iron, copper, lithium and mixtures thereof obtained as fine precipitated particles by double decomposition in water and having a melting point above about 150° C., the particles being of substantially uniform colour, that will provide a visible change in colour or opacity when subjected to plastic flow or definite deformation by heat or pressure, (b) water, being a liquid carrier for the precipitated soap, and (c) a binder, dispersed or dissolved in the water to provide adhesion for the metal soap particles to a substrate while allowing satisfactory pressure- or heat-deformability of the metal soap particles.

Furthermore, a method according to the present invention of preparing an aqueous coating composition for forming pressure- and heat-sensitive coatings comprises, forming an aqueous solution of sodium, potassium or ammonium soap, adding cations selected from the group consisting of calcium, nickel, iron, copper and lithium to the aqueous solution so that a precipitate of the soap of said cation is formed, providing a water-soluble or dispersible binder in the aqueous composition in a proportion of from about 40 to about 120% by weight of the soap, and providing that the total solids content is within 14 to 40% by weight for spreading application onto a substrate.

DESCRIPTION OF THE INVENTION

The soaps of sodium, potassium and ammonium are substantially soluble in water at room temperature and thus precipitation of the desired particle is carried out by conversion of the soluble soap to an insoluble form, such as the calcium salt. The binder may be a water-soluble type such as polyvinyl alcohol or a non-soluble but water-dispersible type such as polyvinyl acetate. Aqueous solutions of polyvinyl alcohol are particularly favourable because on cooling they form a gel. The resulting coating material consists of the finely divided metal soap particles, homogeneously dispersed in, for example, a polyvinyl alcohol/water gel or other suitable binder-water system. On drying the coating forms a very porous structure which greatly enhances its light-scattering potential.

Application of heat or pressure to the coating of the present invention alters its light scattering characteristics, thereby causing a visible change. However, it is stable to temperature up to 150° C. in the absence of pressure. This is believed to be a decided advantage in its application to a substrate where rapid drying is required. The temperature stability of the coating is dependent on the melting point of the dispersed particles. In the case of calcium stearate this temperature is 179° C.

The coating may be applied as an opaque white film over a coloured substrate, so that on the application of pressure or heat the colour of the substrate becomes visible through the treated areas of the coating. Alternatively the coating may be dyed or pigmented so that on pressure or heat printing a darker colour is produced. Additional binders or additives, to modify texture or adhesion of the coating, may be incorporated into the system before or after precipitation of the metal soap, provided they are water-soluble or water-dispersible. Any pigments or dyes should also be water-soluble or water-dispersible.

The insoluble metal stearates of calcium, nickel, copper, manganese, iron and lithium show light scattering characteristics, after precipitation via double decomposition between ammonium stearate and the metal cation. The main requirement is that the metal soap particles precipitate at a suitable small size, e.g. approximately 5 micrometers, and that the resulting suspension exhibits thixotropy. The thixotropic property appears to be necessary to obtain the highly porous structure in the coating, essential to the appearance of the light-scattering effect, on evaporation of the carrier liquid, water. The mechanism appears to be that after application to a substrate the thixotropic coating forms a gel structure which is maintained during evaporation of the water. Removal of the water from the interstices of the gel creates a dry film with high void volume. The voids must be small enough, approximately 0.05 to 2.5 micrometers, to act as point sources for light scattering. Good results were obtained with voids of about 0.5 to 1.5 micrometers.

The fluidity of the coating under shear also varies with the metal cation used to precipitate the soap. For example manganese and lithium stearates give extremely viscous coatings, even under high shear. Consequently coatings containing these stearates are difficult to apply to a substrate. The stearates of nickel, copper and iron give very fluid suspensions but the highly coloured coatings obtained with copper and iron are less satisfactory for many applications. The preferred soaps are calcium and nickel stearates. At a given soap concentration nickel stearate suspensions are considerably more fluid than calcium stearate suspensions and consequently can be utilized at higher solids loading, thereby reducing the amount of moisture to be removed during drying. The solids content of the coatings is important firstly in effecting the opacity achieved by the dry film, and secondly in the fluidity of the coating composition and hence ease of application of the coating. If the solids content is too low then opacity is lost. However, when the solid content is too high the viscosity becomes too great for the coating to be easily applied to a substrate. The total solids content of the aqueous coating composition is generally about 14 to 40% by weight.

Experiments, in which the concentration of soap was determined by measuring the fatty acid concentration, indicate that a minimum level of about 7.0%, w/w, fatty acid such as stearic acid is necessary in the final coating composition to achieve a satisfactory light-scattering effect in the dry film. Practical considerations, such as coating viscosity, restrict the upper limit to about 20%, w/w, stearic acid. Increasing the binder content of the coating composition tends to decrease the opacity and sensitivity of the films, while increasing the adhesion to the substrate and reducing the undesirable waxy feel inherent to the soap components. The amount of binder that can be satisfactorily added depends upon the concentration of stearic acid present in the coating composition. At the lower stearic acid levels the optimum soap to binder ratio is in the range 1:0.7 to 1:1.2. As the stearic acid level is increased the amount of binder that can be tolerated decreases. For example at 20%, w/w stearic acid, the soap to binder ratio should preferably be of the order 1:0.4 to achieve satisfactory opacity. Adhesion to the substrate is inadequate at this binder concentration in many cases, consequently best results are obtained when the stearic acid comprises about 7.5–12% w/w of the coating composition. Thus the amount of binder will be within about 40 to 120% by weight of the soap.

A wide variety of adhesives are suitable as binders. The main restrictions are that the material must be water-soluble or- dispersible and that the binder solution or emulsion must be stable to alkaline pH and high inorganic salt concentrations. Materials of the following types have been used: polyvinylalcohols, polyvinylacetate emulsions, acrylic polymers having solubilizing carboxylic acid groups e.g. acrylic acid polymers and copolymers, ureaformaldehyde polymers and other aminoplast resins having water-dispersibility, particularly wet strength resin, substituted cellulose polymers (e.g. sodium carboxymethylcellulose) and neoprene rubber latexes. If the polymer is also a dispersing agent, such as polyvinylalcohol and sodium carboxymethylcellulose, then more stable coating suspension are formed which give smoother textured dry films. Usually a combination of binders is used to achieve the optimum results. For example, a combination of polyvinylalcohol (a good dispersing agent and gelling agent) and polyvinylacetate (to give a hard coating) gives a suitable binding mixture. Ureaformaldehyde polymers are frequently added to improve the whiteness of the composition.

Suitable dyes or pigments are sudan black, waxoline green, Dupont oil black, Dupont oil orange and sudan III; pigments, for example, lignin, carbon black, ferric oxide and ceric oxide or a mixture of dye and pigment, for example, sudan black plus lignin.

The novel pressure-sensitive coatings may be prepared according to the following method. A water-soluble soap, for example potassium stearate, sodium stearate, sodium hydroxy stearate or ammonium stearate, is dissolved in water which is usually heated. The metal cation is then added to the aqueous solution suitably as a metal halide. Double decomposition then takes place and the insoluble metal soap is precipitated down as finely divided particles.

A preferred method uses ammonium stearate which has been formed in situ in solution by the addition of ammonium hydroxide to stearic acid in aqueous solution. The formation of ammonium stearate in situ is the preferred method of preparation since it allows a higher solids content to be obtained in solution and yields smaller particles of metal stearate.

Other fatty acids besides stearic acid may also be used in the method of the present invention. Hydroxy stearic, palmitic and oleic acids are particularly useful. It is advantageous to mix suspensions of different soaps to obtain a desired balance of properties.

The composition in the form of a thixotropic gel-type paste may be applied to a substrate using a film spreader, but coating by such methods as air knife coating, silk screening, doctor plate, template or roller coating is also contemplated.

This invention requires the production of an opaque porous coating of particles containing a great many voids. The particles and voids should be from 0.05 micrometers to 10 micrometers in diameter, with the most desired size being less than 5 micrometers. The voids preferably are less than about half the size of the particle. Both the particles and the voids should contribute to maximize the light-scattering effects. Particles of from 0.05 micrometers to 10 micrometers would give a significant light-scattering effect with the most prominent effect being obtained from particles and voids of 0.5 to 5 micrometers. Applicants have discovered that with the above mentioned particle and void size in a matrix structure coating an unexpected synergistic effect is created with regard to reflectivity of the coating. A soft binder acts to bind these particles to a suitable substrate. Under pressure, as in a credit card application, or heat as in laser or infrared printing, the opaque bonded porous layer must compact to give a smooth transparent surface. A collapsible porous structure in the layer is desirable to improve the optical contrast on plastic flow of the solid particles during printing. Coatings of the invention are particularly applicable to laser or microwave or infrared printing.

BRIEF DESCRIPTION OF THE DRAWING

The accompanying FIGURE graphically illustrates the reflectance or opacity of coatings having different soap to binder ratios and methods of preparation.

DESCRIPTION OF THE PREFERRED EMBODIMENTS

Particular coating compositions and results will now be described in the following examples.

EXAMPLE 1

40 g. of potassium stearate were dissolved in 20 ml. of hot water by vigorous stirring in a Waring Blender. 10 g. of calcium chloride which were dissolved in 10 ml. of water was then slowly added to the vigorously stirred soap solution. Finely divided calcium stearate particles precipitated down. 70 g. of Bondfast (polyvinylacetate emulsion with 35% solids) was then blended into the soap suspension until a creamy paste formed. The final coating material was a gel-like, thixotropic paste that gave a pressure-sensitive film after drying on a substrate.

EXAMPLE 2

20 ml. of water, 20 g. of sodium stearate and 10 g. of polyvinyl alcohol (Monsanto Gelvatol 1-90—Trade mark) were heated and mixed in a Waring Blender until all solids dissolved. 10 g. of calcium chloride dissolved in 10 ml. of water was then added to the vigorously stirred hot solution. Calcium stearate is precipitated down to form a grainy, intractable paste which was blended until it attained a uniform creamy consistency. On drying on a substrate this paste formed a very white, opaque pressure-sensitive film.

EXAMPLE 3

200 ml. of water, 20 g. of sodium 12-hydroxy stearate, 7.5 g. of Gelvatol 1-90 polyvinylalcohol and 5 g. of Acrysol WS-32 (Rohm & Haas—Trademark for an acrylic polymer solution in water) were heated and vigorously stirred in a Waring Blendor until a solution formed. 10 g. of calcium chloride in 10 ml. of water was then added to the vigorously stirred solution until a creamy paste formed. After drying on a substrate an opaque pressure-sensitive film was obtained. The addition of acrylic polymer improved the toughness of the final coating, compared to Example 2.

EXAMPLE 4

200 ml. of water, 20 g. of sodium 12-hydroxy stearate, 10 g. of potassium stearate, 10 g. of Gelvatol 1-90 polyvinylalcohol and 5 g. of Acrysol WS-50 acrylic polymer were heated and dissolved in a vigorously stirred Waring Blendor. 10 g. of calcium chloride dissolved in 10 ml. of water was then added to the vigorously-stirred hot solution. The coating composition thus formed gave an opaque pressure-sensitive film after drying on a substrate.

EXAMPLE 5

272 ml. of water, 10 g. of Gelvatol 1-90 polyvinylalcohol and 5 g. of Acrysol WS-32 acrylic polymer were heated until the binders dissolved. 50 g. of stearic acid was then added and melted to form a liquid layer floating on the aqueous solution. 23 ml. of ammonium hyroxide (28% solution), which was the stoichiometric amount to form ammonium stearate, was then added dropwise to the gently stirred liquid. An intractable gel is formed which was transferred to a vigorously-stirred Waring Blendor, and then 20 g. of calcium chloride dissolved in 20 ml. of water slowly added until the mixture became solid. 50 ml. of water was then added with stirring until a creamy paste formed. After drying on a substrate this material gave a pressure-sensitive film with excellent hiding power. The formation of ammonium stearate in situ is the preferred method of preparation because it allows a higher solids content to be obtained and yields smaller particles of calcium stearate. The density of the dry coating was 0.5 g./cc which is equivalent to about 50% void volume.

EXAMPLE 6

A sample of the paste prepared in Example 5 was blended with a ureaformaldehyde wet strength resin in the following proportions:

10 g.-paste from Example 5.

1 g.-Casco PR 247 (Borden Chemical Trademark—a cationic ureaformaldehyde wet strength resin)

These components were blended together to give a more fluid coating composition. After drying, this coating gave a more pressure-sensitive film, with greater adhesion and better "feel" (i.e. less waxy) compared to the film of Example 5. The density of the film was 0.34 g./cc. Such low density coatings are more desirable because this low density means decreased coating weight is required to give adequate coverage.

EXAMPLE 7

10 g. of Gelvatol 1-90 polyvinylalcohol, 5 g. of Acrysol WS-32 acrylic polymer and 160 ml. of water was heated with vigorous stirring to dissolve the solids. 25 g. of stearic acid together with 0.6 g. of sudan black dye (dissolved in the acid) were then added to the solution followed by 12 ml. of ammonium hydroxide (28% solution) which was added dropwise with mild agitation of the liquid. A gel formed and was transferred to a Waring Blendor. 10 g. of calcium chloride dissolved in 10 ml. of water was then slowly added to the blender with vigorous stirring of the gel therein and a further 15 ml. of water added to give a creamy paste. After spreading the coating on a substrate a light blue film formed upon drying, and upon the application of pressure a darker, contrasting blue was observed.

EXAMPLE 8

A sample was prepared as described above in Example 7 except that 2 g. of Aquadag (trademark—dispersion of colloidal graphite in water) was used instead of sudan black. A grey film was obtained after drying on a substrate which gave a constrasting black upon the application of pressure.

EXAMPLE 9

The composition similar to that of Example 5 was prepared followed by the addition of approximately 40 g. of the Casco resin PR-247. The mixture was blended for 5 minutes and then allowed to cool. The composition had about 10% stearic acid, 5% binder and 20% of total solids with a soap to binder of 1.9:1.

This coating gave an excellent pressure-sensitive film that can be readily applied by continuous coaters. The adhesion and "feel" (waxiness) can be improved by the addition of polyvinylacetate to the coating in the ratio of about 1:10. This gives a composition having about 8.8% stearic acid, 7.5% binder and 20.6% of total solids.

EXAMPLE 10

A pressure-sensitive composition was prepared as follows:

250 ml. of water, 9 g. of Gelvatol (1-90) and 7 g. of Acrysol WS-32 were heated and stirred to dissolve the polymers. 46 g. of stearic acid was melted and dispersed in the hot polymer solution. 21 ml. of $NH_4OH$ (28% solution) was added dropwise to gently agitated mixture, and a resulting gel transferred to a blender. 18.2 g. of $NiCl_2$ $6H_2O$ dissolved in 20 ml. of water (approximately stoichiometric quantity to convert stearic acid to nickel stearate) was added slowly to vigorously stirred gel, giving a very fluid system. 36 g. of the Casco PR-247 resin was blended in and blending continued for about 5 to 10 minutes. A very smooth "cream" was obtained. This composition gave an excellent pressure-sensitive film but "feel" and adhesion were not fully satisfactory. "Cream" composition: 11.3% stearic acid, 5.5% binder and 19.3% total solids, soap to binder ratio 2.1:1. Addition of more binder gave improved adhesion and "feel".

EXAMPLE 11

200 ml. of water, 14 g. of Acrysol WS-32 and 18 g. Gelvatol (1-90) were mixed and heated until polymers dissolved in the hot water. 92 g. stearic acid was melted and dispersed in the hot polymer solution. 42 ml. of $NH_4OH$ (28% solution) was added dropwise to the gently stirred mixture. A gel formed, which was transferred to a Waring Blendor, then 36.4 g. of $Nicl_2.6H_2O$ in 30 ml. of water was added to the vigorously stirred gel, yielding a very thick cream. 72 g. of the Casco PR-247 resin was added and the system became very fluid under vigorous agitation. Composition: 18.2% stearic acid, 8.9% binder and 31.1% total solids, soap to binder ratio 2.0:1. On spreading and drying, the resulting film had poor opacity and sensitivity.

This formulation was repeated using less binder (all other ingredients retained in the same amounts) i.e. 10 g. of Acrysol WS-32, 9 g. of Gelvatol (1-90) and 36 g. of Casco PR-247. The resulting dry coating had excellent opacity and sensitivity. However adhesion and "feel" were less satisfactory.

Composition: 20.8% of stearic acid, 4.8% of binder and 30.2% total solids, soap to binder ratio 4.3:1.

Additional binder was added to the coating composition to determine the optimum level; Rohm and Haas Acrysol WS-50 (38% solids) was used for this test. Sufficient binder was added to give the following—

Composition: 18.9% stearic acid, 7.8% binder 30.6% total solids soap to binder ratio 2.4:1. These proportions gave a good combination of properties. Addition of further binder to this composition caused the desired properties of the film to deteriorate.

The contrast on printing for the dyed and pigmented coatings is much improved if the coatings are rapidly dried by the application of heat from the reverse side of, for example, the coated paper. When this is done a much lighter coloured opaque coating is obtained.

EXAMPLE 12

50 g. of Gelvatol 1-90 polyvinylalcohol, 40 g. of Acrysol WS-32 acrylic polymer and 1375 ml. of water was heated to dissolve the solids until a clear solution was obtained. 250 g. of stearic acid was added which melted and dispersed in the stirred solution followed by 115 ml. of ammonium hydroxide (28% solution) which was added dropwise to the stirred dispersion of stearic acid in polymer solution. A gel of ammonium stearate was formed. 100 g. of calcium chloride dissolved in 100 ml. of water was then added to the vigorously stirred gel to precipitate the calcium soap. 350 ml. of water, 200 g. of Casco PR 247 (Borden Chemical trademark—a cationic ureaformaldehyde wet strength resin), and 250 g. Bondfast adhesive (polyvinylacetate emulsion with 35% solids) were added and blending continued until a smooth consistency was obtained. The product was a thixotropic smooth creamy white suspension. The composition is as follows:

| | |
|---|---|
| Total solids | 20.3% |
| Calcium stearate | 9.8% |
| Soap to Binder | 1:0.76 |

A coating of the composition was spread on a light weight, black paper, using a knife-coater. Application was made at a blade clearance of 0.005", and the resulting coating was dried with a hot air blower. The final coating thickness was about 0.001".

| PROPERTY | |
|---|---|
| *Reflectance (%) | 65.7 |
| Pressure Sensitivity | Very good*** |
| [1]Adhesion to Paper (%) | 50 |
| Mar Resistance | Very Good |
| Feel | Not Waxy |
| [2]Heat Resistance | 128° C. |
| Density (g/cc) | 0.65 |

*Measured on a Hunter Reflectometer, using a green filter. Higher reflectance indicates greater opacity. Standard typewriter paper has a reflectance of 79.0%.
***No transfer of coating, excellent definition.
[1]Measured by estimating the amount of coating remaining on substrate after peeling off a piece of adhesive tape pressed onto the surface.
[2]Maximum temperature that coating can withstand before opacifying structure is lost.

Various other coatings were prepared in an identical manner except that the anion or cation was changed. The total solids content was about 20% in all cases. The following Table I illustrates relevant properties of various soap compositions and coatings produced therefrom.

TABLE I

| Soap | Consistency of Composition | Color of Suspension | Appearance of Dry Coating | Pressure Sensitivity |
|---|---|---|---|---|
| Mg Stearate | Paste | White | Semi-transparent | None |
| Ba Stearate | Fluid suspension | White | Semi-transparent | None |
| Zn Stearate | Fluid suspension | White | Semi-transparent | None |
| Al Stearate | Fluid suspension | White | Slightly opaque | Very poor |
| Ni Stearate | Thixotropic | Pale Green | Opaque white | Very good |
| Cu Stearate | Thixotropic | Pale blue | Pale blue opaque | Very good |
| Mn Stearate | Very stiff paste | White | Opaque white | Poor |
| Li Stearate | Very stiff paste | White | Opaque white | Good |
| Sn Stearate | Fluid suspension | Pale Yellow | Transparent | None |
| Fe Stearate | Thixotropic | Brown | Buff opaque | Very good |
| Ca Stearate | Thixotropic | White | Opaque white | Very good |
| Ca Oleate | Fluid suspension | White | Slightly opaque | Poor |

In a general sense the effect of binder content upon the final coating can be assessed from examples 1 to 12. In these examples, the ratios of soap to binder are respectively as follows:

1:0.6, 1:0.5, 1:0.4, 1:0.4, 1:0.22, 1:0.5, 1:0.5, 1:0.5, 1:0.5 also 1:0.85, 1:0.5, 1:0.5 also 1:0.23 also 1:0.4 and 1:0.6.

It can be seen that examples 5 and 11 describe coatings which lie outside the range of 1:0.4 to about 1:1.2 alternatively stated as 40 to about 120% binder by weight of the soap). Although the dried coating in example 5 gives a pressure-sensitive film with excellent hiding power, the adhesion and feel of the coating is unsatisfactory. Example 6 wherein the soap to binder ratio is increased to 1:0.5, teaches a coating having pressure-sensitivity together with greater adhesion and better "feel". In example 11, the first part discloses a coating having a soap to binder ratio of 1:0.5, the coating having poor opacity and sensitivity. When the amount of binder is reduced, the soap to binder ratio being 1:0.23, the opacity and sensitivity is increased but adhesion and feel were less satisfactory. When the binder content was increased to 40% of soap content, a good combination of properties was obtained. Thus, it can be seen that several desired properties in the coating product determine the amount of binder in the composition and coating.

Applicants prepared a further series of coatings, in order to illustrate the effect of binder concentration and preparation procedure on the opacity, pressure-sensitivity and adhesion to substrate of the coatings. These properties of the coatings are graphically illustrated in the accompanying FIGURE. Series of coatings were prepared as follows: Coating Standard No. 2; A basic coating was prepared according to the procedures taught in the above mentioned Examples 1-12. The binder content was reduced to a minimum level acceptable for adhesion of the coating to a substrate. As usual, approximately a two fold excess of calcium chloride was used to precipitate the insoluble soap. The proportions used were as follows:

Water—275 mls.
Gelvatol 1-90—10 g.
Polymer dissolved in warmed stirred water.
WS-32—8 g.
Stearic acid—50 g.
Fatty acid added to warm polymer solution and mixture stirred until all acid melted.
$NH_4OH$(28%)—23 mls.
Alkali added slowly with stirring.
$CaCl_2$—20 g. in 10 mls. water.
(2×stoichiometric amount, 9.2 g.)
Added slowly to stirred gel; mixture initially became more mobile, then grainy and finally solid.

Water—70 mls.
Mixture became mobile and stirrable.
CascoPR247—40 g.
Blended for 5 minutes. A highly thixotropic composition, especially after addition of CascoPR247 resin, was obtained. This resin causes a marked decrease in viscosity under shear in conjunction with soap precipitation using excess calcium chloride. The reflectance for this basic coating is shown on the FIGURE. Additions of Bondfast adhesive B (polyvinylacetate) were made to this basic composition to vary the soap to binder ratio, these results being shown by series 2 on the graph of the accompanying FIGURE. Four additional coatings were prepared as follows:

| (1) | Std #2 | 20 g. | soap:binder ratio |
|---|---|---|---|
|  | Bondfast (polyvinylacetate emulsion) | 2 g. (35% solids) | 1:0.8 |
| (2) | Std #2 | 20 g. | 1:1.15 |
|  | Bondfast | 4 g. |  |
| (3) | Std #2 | 20 g. | 1:1.50 |
|  | Bondfast | 6 g. |  |
| (4) | Std #2 | 20 g. | 1:1.85 |
|  | Bondfast | 8 g. |  |

It is apparent from the Series 2 coatings that there is a marked decrease in film opacity as the binder content is increased. Furthermore, although the pressure-sensitivity is still operable at high binder concentrations, the coatings are not aesthetically acceptable because of low opacity. Adhesion, as indicated by degree of coating transference to a top sheet is improved as binder concentration is increased. Mar resistance and "feel" are optimum at soap:binder ratios greater than 1:0.7. The acceptable range of soap to binder ratio is 1:0.4, to 1:1.2.

Coating Standard No. 3; in this example a coating composition was prepared using the same procedure as for coating standard No. 2 except that the approximate stoichiometric amount of calcium chloride was used in the formulation. In this case, the thixotropic property of the composition was not highly developed (i.e. viscosity reduced only slightly under shear, composition was not pourable). This coating gave poor coverage with low opacity as can be seen from the graph. Thus, the condition of precipitation are extremely important in the development of desirable film or coating properties.

Coating Standard No. 1; the same procedure was followed although the bulk of the binder content was omitted in the original preparation and no excess of calcium chloride was used in the soap precipitation step. A thick paste with a grease-like consistency but possessing no thixotropic properties was obtained. Addition of binder to this composition did not yield a thixotropic system, and a progressive decrease in opacity was obtained until the films were essentially transparent at a soap to binder ratio of 1:2.0.

The proportions used in the preparation of Coating Standard #1 were as follows:
Water—275 mls.
Gelvatol 1-90—10 g.
(monsanto polyvinylalcohol)
Gelvatol was dissolved in the warmed, stirred water.
Stearic acid—50 g.
Added to hot polymer solution and stirred until melted.
NH₄OH(28%)—23 mls.
Added slowly to stirred mixture. Translucent gel formed, transferred to Waring Blendor jar.
CaCl₂—10 g. dissolved in 10 mls H₂O (stoichiometric amount 9.2 g.)
Salt solution added slowly to stirred gel, initially mixture became fluid but then reverted to grease-like consistency.

Water—70 mls.
Difficult to mix, blender did not work well.
Water—15 mls.
Blended and mixed by hand. Thick paste, not thixotropic. The soap:binder ratio was 1:0.2.
Five additional coatings were prepared as follows:

| (1) | Std #1 - 50 g. |  | soap:binder ratio |
|---|---|---|---|
|  | Casco PR247 - 2.2 g. | (27% solids) |  |
|  | (Borden U.F. wet strength adhesive) |  | 1:0.6 |
|  | WS - 32 - 8.2 g. | (22% solids) |  |
|  | (Rohm 1 Haas acrylic polymer soln) |  |  |
| (2) | Std. #1 | 50 g. | soap:binder ratio |
|  | Casco PR245 |  | 1:0.8 |
|  | WS - 32 | 11.6 g. |  |
| (3) | Std. #1 | 50 g. |  |
|  | Casco PR247 | 5.2 g. | 1:1.2 |
|  | WS - 32 | 19.1 g. |  |
| (4) | Std. #1 | 50 g. |  |
|  | Casco PR247 | 7.3 g. | 1:1.6 |
|  | WS - 32 | 26.9 g. |  |
| (5) | Std. #1 | 50 g. | 1:2.0 |
|  | Casco PR247 | 9.4 g. |  |
|  | WS - 32 | 34.4 g. |  |

The reflectance of films from these compositions are shown on the graph.

Coating Series 2 and 1 and standard coating No. 3 demonostrate the effect of the precipitant, calcium chloride, on the thixotropic nature of compositions thus prepared and of reflectance on eventual dry coatings. The 12 preceding examples, use a precipitant which is added in an amount of 1.5, 2.8, 2.6, 2.0, and the remaining examples 2.2 times the stoichiometric amount.

The results which are graphically illustrated in the FIGURE show that the procedure described in the Examples is essential for the formation of adequate pressure-sensitive coatings.

Pressure-coatings were obtained primarily with the following soaps Ni(St)$_2$, Ca(St)$_2$, Fe(St)$_2$, Cu(St)$_2$ and LiSt. Of these only nickel, calcium and lithium stearates give white coatings, which appears to be a requirement for aesthetic reasons. The lithium containing soap had very high viscosity and is probably unacceptable alone from that point of view.

All the pressure-sensitive coatings are thixotropic to some extent. This may cause some difficulty in continuous coating devices when not enough shear is applied. One way of avoiding this problem is by incorporating up to 50% calcium oleate soap. This soap forms fluid, less thixotropic suspensions. Although calcium oleate soaps themselves give very poor opacity, a combination of oleate and stearate gives an opacity close to that for the stearate alone, and is easier flowing and yet has adequate thixotropy to give the desired coating structure.

Thus a coating of desired properties by suitable combination and/or variation of the metal cations and soaps in the aqueous coating composition.

Scattering coefficients were calculated for our coatings using date obtained from films of known thickness which were applied to substrates having both black and white backgrounds. Reflectivity measurements were made over both backgrounds and were used to calculate the Kubelka-Munk scattering coefficients. Values of 4.4 mil$^{-1}$ were obtained for this metal soap-void system according to this invention. This is larger by a factor of two than the value expected for voids alone and demonstrates that the finely divided metal soap particles are acting as a pigment in synergistic conjunction with the micropores.

Further enhancement of film reflectivity was obtained when small quantities of $TiO_2$ pigment were added to these opaque metal soap coatings. With voids of 56 volume %, soap and binder of 42 volume % and $TiO_2$ of 2 volume %, the film scattering coefficient was further increased to 8.9 mil$^{-1}$. These calculations demonstrate the optical benefits which accrue as a result of using combinations of voids and pigments.

What we claim as our invention is:

1. A thixotropic composition, which on drying on a substrate forms a pressure- and heat-sensitive coating having voids of about 0.05 to 10 micrometers in diameter, comprising meldable metal soap particles of about 0.05 to 10 micrometers in diameter and having a cation selected from the group consisting of calcium, nickel, iron, copper, manganese, and lithium obtained as contiguous fine precipitated particles by double decomposition in water and having a melting point above about 150° C., the particles being of substantially uniform colour, that will provide a visible change from an opaque colour to a contrasting colour or transparent form when subjected to plastic flow or definite deformation by heat or pressure, water, being a liquid carrier for the precipitated soap, and a binder, dispersed or dissolved in the water to provide adhesion for the metal soap particles to a substrate without decreasing the pressure or heat deformability of the metal soap particles, the fatty acid of the soap being present in a concentration of about 7% to about 20% by weight and the binder being present in the composition in a proportion of from about 40 to about 120% by weight of the fatty acid of the soap, the lower proportions being used with the higher soap concentrations.

2. The composition of claim 1 wherein the fatty acid of the metal soap has from 16 to 18 carbon atoms.

3. The aqueous coating composition of claim 2 wherein the fatty acid is chosen from stearic acid, palmitic acid and mixtures thereof, with at most, minor amounts of oleic acid.

4. The aqueous coating composition of claim 2 wherein the soap-forming cation is at least one of Ca and Ni.

5. The aqueous coating composition of claim 1, 2 or 3 wherein said precipitated particles are from about 1 to about 10 micrometers in diameter.

6. The aqueous coating composition of claim 1, wherein said precipitated particles are from about 0.5 to about 5 micrometers in diameter.

7. The aqueous coating composition of claim 1 wherein the binder is a mixture of (i) polyvinyl alcohol or alkaline salt of carboxymethylcellulose, as dispersant-binder (ii) as non-dispersant binder at least one of polyvinyl acetates, acrylic polymers and aminoplast condensation products.

8. The aqueous coating composition of claim 2 wherein the fatty acid concentration of the metal soap is from about 7.5 to about 12% by weight of the total dispersion and the binder is present in from about 100 to about 120% by weight of the fatty acid of the soap, the composition having an easily-spreadable paste consistency.

9. The aqueous coating composition of claim 1 having a total solids content of about 14 to about 40% by weight.

10. The aqueous coating composition of claim 1 wherein calcium stearate is the metal soap present in a major proportion of total soap.

11. The aqueous coating composition of claim 1 wherein nickel stearate is the metal soap present in a major proportion of total soap.

12. A pressure- and heat-sensitive coating or layer having an opaque highly compactible open porous continuous matrix structure of contiguous fine light-scattering meldable metal soap particles and fine light-scattering open voids; the particles and voids each being about 0.05 to 10 micrometers in diameter, the particles being obtained as a precipitate by double decomposition in water and having a melting point above about 150° C., the particles being of substantially uniform opaque colour that will provide a visible change to a contrasting colour or transparent form when subjected to plastic flow or deformation by heat or pressure and a binder providing adhesion for the metal soap particles to a substrate while allowing satisfactory pressure- or heat-deformability of the metal soap particles, the fatty acid of the soap having been present in a concentration of about 7% to about 20% by weight in the coating composition before deposition and the binder being present in the composition in a proportion of from about 40 to about 120% by weight of the fatty acid of the soap, the lower proportions being used with the higher soap concentrations.

13. The coating of claim 12 wherein the metal soap particles have a cation selected from the group consisting of calcium, nickel, iron, copper, and lithium and fatty acid of the metal soap has from 16 to 18 carbon atoms.

14. The coating of claim 12 wherein the binder is a non-waxy, water soluble or water-dispersible binder selected from the group consisting of polyvinyl alcohols, polyvinyl acetates, acrylic polymers, aminoplast condensation products and mixtures thereof.

15. The coating of claim 12 wherein the metal soap comprises a stearate or hydroxystearate.

16. The coating of claim 12 wherein the metal soap comprises an oleate.

17. The coating of claim 12 wherein the metal soap comprises a palmitate.

18. The coating of claim 12 wherein the weight ratio of fatty acid of the soap to binder is in the range of 1:0.7 to 1:1.2.

19. The coating of claim 12 wherein the coating has a light colour adapted to yield a dark version of the same colour on application of pressure.

20. The coating of claim 12 wherein the binder is a mixture of (i) polyvinyl alcohol or alkaline salt of carboxymethylcellulose, as dispersant-binder and (ii) as non-dispersant binder at least one of polyvinyl acetates, acrylic polymers and aminoplast condensation products.

21. The coating of claim 12 further comprising dye or pigment.

22. The coating of claim 12 further comprising titanium dioxide as pigment.

23. A method of preparing an aqueous coating composition of high solids content suitable for deposition of pressure- and heat-sensitive coatings which comprises: forming an aqueous solution of a sodium, potassium or ammonium soap, adding metal cations selected from the group consisting of calcium, nickel, iron, copper, and lithium to the aqueous solution so that a precipitate of the soap of said cation is formed, providing a water-soluble or -dispersible binder in the aqueous composition in a proportion of from about 40 to about 120% by weight of the fatty acid of the soap, and providing that the total solids content is within 14 to 40% by weight for spreading application onto a substrate.

24. The method of claim 23 wherein the cation is added to the aqueous solution as an aqueous solution of the metal halide.

25. The method of claim 23 wherein the metal cation is added in an amount two times the stoichiometric amount.

26. The method of claim 23 wherein the formation of said initial aqueous solution of soap is by the addition of ammonium hydroxide to a fatty acid water mixture.

27. The method of claim 26 wherein ammonium hydroxide is added to stearic acid in water followed by the addition of the chloride of said metal to give the precipitate of said metal stearate.

* * * * *